United States Patent [19]

Sheppard

[11] 3,902,117

[45] Aug. 26, 1975

[54] PCM ERROR DETECTION

[75] Inventor: David Sheppard, Benfleet, England

[73] Assignee: International Standard Electric Corporation, New York, N.Y.

[22] Filed: Jan. 24, 1974

[21] Appl. No.: 436,301

[30] Foreign Application Priority Data

Feb. 8, 1973 United Kingdom .............. 6211/73

[52] U.S. Cl. ........................ 325/38 A; 340/347 DD

[51] Int. Cl.² ............................................ H04L 3/00

[58] Field of Search ........ 325/38 R, 38 A, 321, 323; 340/347 DD, 146.1 R

[56] References Cited

UNITED STATES PATENTS

| | | | |
|---|---|---|---|
| 3,369,229 | 2/1968 | Dorros | 340/347 DD |
| 3,518,662 | 6/1970 | Nakagome et al. | 325/38 A |
| 3,611,141 | 10/1971 | Waters | 325/38 A |
| 3,753,113 | 8/1973 | Maruta et al. | 325/38 A |

*Primary Examiner*—Benedict V. Safourek
*Attorney, Agent, or Firm*—John T. O'Halloran; Menotti J. Lombardi, Jr.; Alfred C. Hill

[57] ABSTRACT

The error detection arrangement operates on a special code produced by converting a 4 bit binary code word into either of two 3 bit ternary words of opposite polarity disparity values so as to reduce to a minimum the accumulated disparity of the ternary words transmitted. The arrangement derives at the conclusion of each ternary word the polarity of the accumulated disparity. This polarity is stored in a temporary store. In addition, the polarity of the disparity is derived at the conclusion of each ternary word. Logic circuitry determines when the polarity of the disparity for a word is the same as the accumulated disparity at the conclusion of the previous word and produces an error output when the two polarities are the same. When an error output is produced, the information in the temporary store is corrected.

6 Claims, 4 Drawing Figures

| | A2 | B2 | C | D | $\overline{S0}$ | $\overline{S1}$ | $\overline{S2}$ | $\overline{S3}$ | |
|---|---|---|---|---|---|---|---|---|---|
| +ve Error | 0 | 0 | 0 | 0 | 0 | 0 | 0 | 0 | FN = AN - 1 |
| - Normal { | 1 | 0 | 1 | 0 | 0 | 1 | 1 | 0 | FN = AN + BN |
| | 0 | 1 | 1 | 0 | 0 | 1 | 1 | 0 | FN = AN + BN |
| -ve Error | 1 | 1 | 1 | 1 | 1 | 1 | 1 | 1 | FN = AN |

Logic Functions for non zero disparity words

ALU Functions

PCM ERROR DETECTION

BACKGROUND OF THE INVENTION

This invention relates to a means for determining errors in a pulse code modulation (PCM) system in which for transmission purposes digital information is conveyed in a special line code designed to reduce to a minimum the accumulated disparity of the line signals.

High speed digital transmissions present difficulties, particularly when signals, such as television signals, are transmitted by binary PCM techniques. One approach towards overcoming difficulties caused by high digit rates is to translate the binary coded information signals into ternary coded signals, on the basis that a four digit binary word can be translated into a three digit ternary word.

A system using this technique has been described in U.S. Pat. No. 3,611,141 whose disclosure is incorporated herein by reference, and is known as 4B3T. An advantage of this technique is that certain four digit binary words can be translated into either of two ternary words having opposite disparity values. By monitoring the accumulated disparity of the transmitted signal it is possible to choose from such pairs of ternary words words of the appropriate disparity value to effect, where necessary, a reduction in the accumulated disparity of signal and, thus, maintain the disparity of the signal within predetermined limits.

Thus, in a typical 4B3T transmit translator ternary words of positive disparity are sent when the accumulated disparity is negative and vice versa. The accumulated disparity is the sum of the word disparities and, in the 4B3T system, has only six possible states at the end of each word. These are +2, +1, 0, −2 and −3 (0 is regarded as being a positive value). If the accumulated disparity is calculated separately in the receive translator, by the addition of word disparities, the same sequence of disparity values as that at the output of the transmit translator will be obtained, assuming that there are no digital errors in transmission. Any digital errors which do occur will generally lead to violations of the 4B3T translation rules.

SUMMARY OF THE INVENTION

An object of the present invention is the provision of a receive translator that will detect errors in the 4B3T signals received at a receiver after transmission from a transmitter.

A feature of the present invention is to provide a receive translator for a PCM system in which, for transmission, digital words having one disparity polarity are transmitted when the accumulated disparity of the transmitted signal is of the opposite polarity, and vice versa, the translator comprising first means for deriving at the conclusion of each digital word in the transmitted signal the polarity of the accumulated disparity of the transmitted signal; second means coupled to the first means for temporarily storing the polarity of the accumulated disparity derived in the first means; third means coupled to the first means for providing at the conclusion of each digital word in the transmitted signal the polarity of the disparity of that word; and logic means coupled to the first means, the second means and the third means to detect when the polarity of the disparity for a digital word is the same as the polarity of the accumulated disparity for the transmitted signal at the conclusion of the previous digital word, to generate an error output signal when the two polarities are detected to be the same and to correct the information in the second means when an error output is generated.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
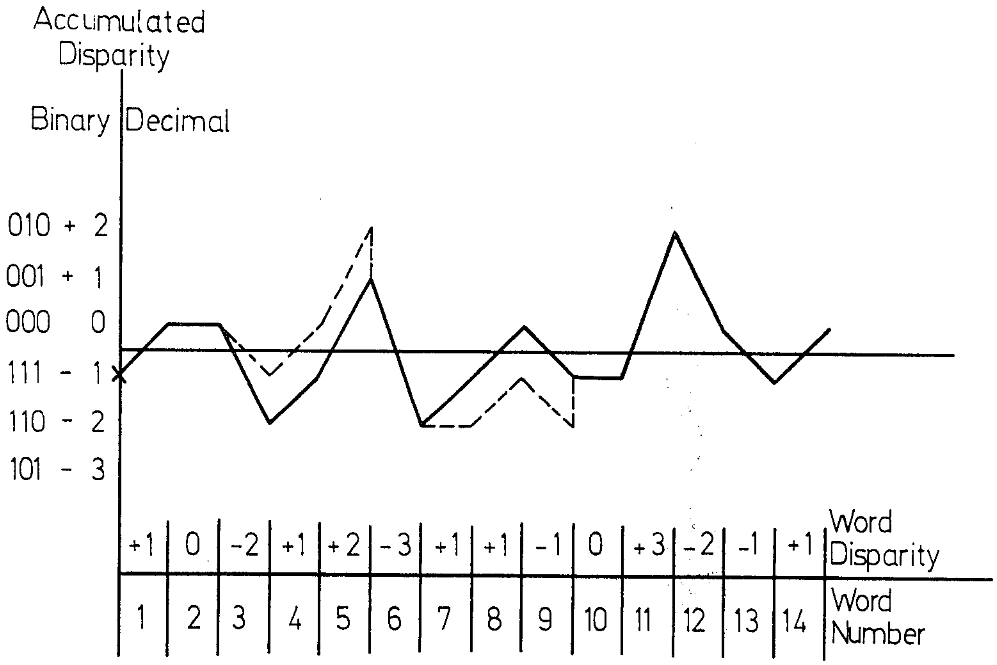
FIG. 1 illustrates how, in principle, a 4B3T system can be used to maintain the disparity of a line signal at a minimum.

The accumulated disparity in a PCM system is the sum of the word disparities. The word and accumulated disparities are characteristics of the transmitted code signal. In a 4B3T system the transmit translator emits words of positive disparity when the accumulated disparity has a negative value, and vice versa. The transmit translator is fully disclosed in the above-cited U.S. Pat. No. 3,611,141. The accumulated disparity in such a system can have one of only six possible states at the end of each word. These are designated +2, +1, 0, −1, −2 and −3. Note that in this sequence 0 is regarded as a positive value in so far as the polarity of the disparity is concerned. The changes in the accumulated disparity of a typical PCM 4B3T transmission are shown in FIG. 1, the error free signal being the solid line. If the accumulated disparity is calculated in the receive translator by the addition of successive word disparities it will, in the absence of errors, be the same as that calculated by the transmit translator. It is the polarity of the accumulated disparity as calculated in the transmit translator which governs the choice of polarity for the next word having disparity which is to be transmitted. Thus, in the sequence shown in FIG. 1, when the accumulated disparity is 0, as at word number 2, a negative disparity word number 3 is sent. The effect of errors is shown by the broken line in FIg. 1. A single positive error in word number 3 i.e. one that causes the receive translator to calculate the word disparity as −1 instead of −2, causes the accumulated disparity to go to −1 instead of −2. After word number 4 it then is 0 instead of −1. This causes, so far as the receive translator is concerned, the +2 word disparity of word number 5 to follow the positive polarity accumulated disparity at the end of word number 4. This is a violation of the 4B3T translation rules. Therefore, by calculation of the word and accumulated disparities at the receive translator and using logic to compare their respective polarities it is possible to detect errors in the received ternary coded signals. The incorrect accumulated disparity after word number 5 results from adding the +2 word disparity of word number 5 to an accumulated disparity of 0 instead of −1. Therefore, the correct value of the accumulated disparity is in fact the word disparity (in this +2 for word number 5) minus 1, resulting in an accumulated disparity of +1.

Similarly, a single negative error in word number 7 causes the accumulated disparity after word number 8 to be −1 instead of 0. Then word number 9, with a disparity of −1 follows, and again there is a violation of the translation rules. The correct value of the accumulated disparity after word number 9 should be −1, which is in fact the same value as the word disparity of word number 9.

Summarizing, there are four rules for error detection:

a. If a positive accumulated disparity is followed by a word having a positive disparity of +2 or +3 an error has occurred. To detect subsequent errors the accumulated disparity must then be corrected by setting it equal to the last word disparity minus 1.

b. If a positive accumulated disparity is followed by a word having a positive disparity of +1 an error has occurred. To detect subsequent errors the accumulated disparity must then be corrected by setting it equal to the last accumulated disparity.

c. If a negative accumulated disparity is followed by a word having a negative disparity of −2 or −3 an error has occurred. To detect subsequent errors the accumulated disparity must then be corrected by setting it equal to the last word disparity.

d. If a negative accumulated disparity is followed by a word having a negative disparity of −1 an error has occurred. To detect subsequent errors the accumulated disparity must then be corrected by setting it equal to the last accumulated disparity.

The differences between the two correction procedures (a) and (b), and for that matter between (c) and (d), arises from the fact that an accumulated disparity value of 0 is regarded as a positive value.

If a multiple error occurs, e.g. a +1 disparity word is received as a −2 disparity word, the number of errors is between 1 and N, where N is the total change in disparity. With randomly distributed errors multiple errors are very rare.

Figure 3:
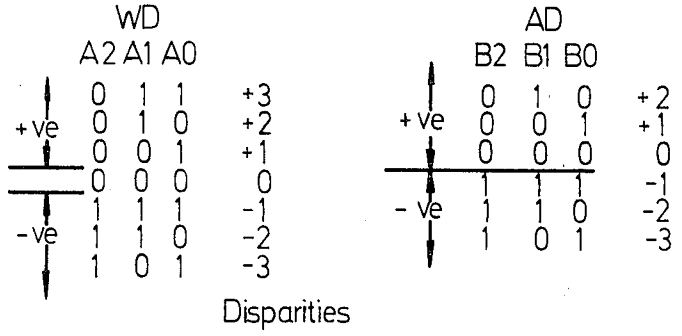
FIG. 3 is a table illustrating logical representations of both word and accumulated disparities in a 4B3T system.
Figures 2, 4:
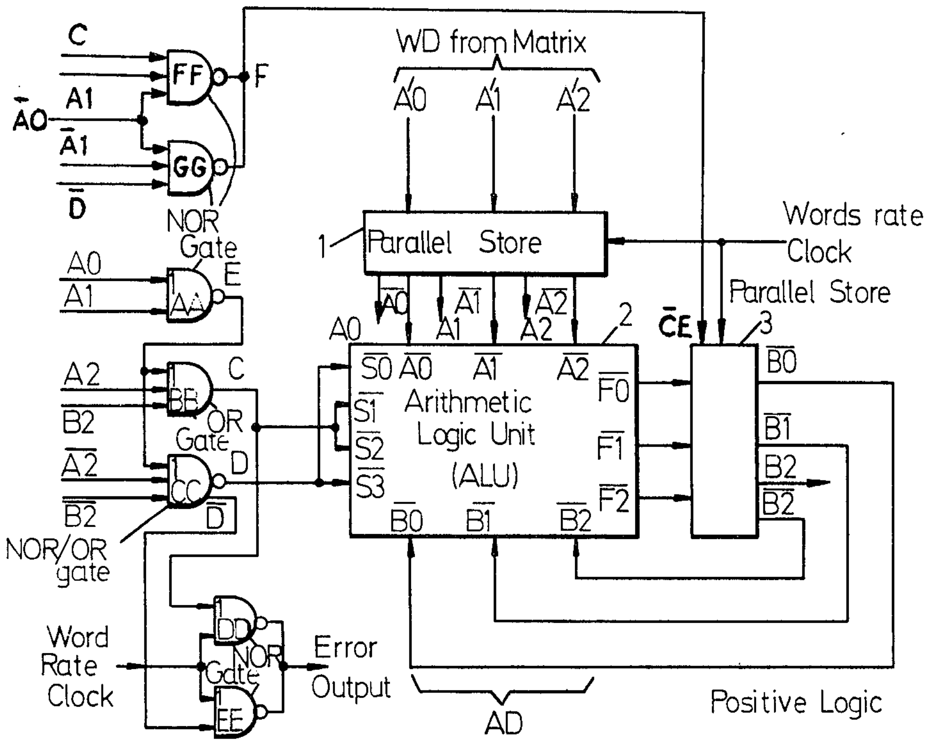
FIG. 2 illustrates a block diagram of a receive translator in accordance with the principles of the present invention.
FIG. 4 is a table illustrating logic functions relevant to the operation of the receive translator of FIG. 2.

In the circuit shown in FIG. 2, the only signal input required is the word disparity of each word. This is determined in a conventional manner by logic (not shown) and is presented as a three bit binary coded word. The signal as received from the line is a 3-bit ternary signal which is applied to an array of logic gates to determine the word disparity according to Table I of the above-cited U.S. Pat. 3,611,141. The disparity of the word is then coded by a further array of logic gates to be a 3-bit binary word. Table WD in FIG. 3 gives the various 3-bit binary words used. The most significant bit A2 denotes the polarity, and the two least significant bits A1 and A0 are simply binary coded representations of the numbers 0 to 3. Note that A1, A0 combinations for +1 and +3 and for −1 and −3 are chosen so that the arithmetic logic unit 2 of FIG. 2 can perform its normal arithmetical functions. The accumulated disparities are similarly presented as 3-bit binary codes as indicated in Table AD in FIG. 3. Again the most significant bit B2 denotes polarity and the codes for the numerical values are chosen to simplify the arithmetic functions.

The operation of the circuit of FIG. 2 is as follows. The 3-bit binary word representing the word disparity is entered into a parallel store 1, from where outputs $\overline{A0}$, $\overline{A1}$ and $\overline{A2}$ are applied to one set of data inputs of the arithmetic logic unit 2. This unit is typically a Motorola unit MC10181. The information is transferred under the control of a word rate clock. The output $\overline{F0}$, $\overline{F1}$ and $\overline{F2}$ of unit 2 constitutes a 3-bit binary word which will give the accumulated disparity and is put into a second parallel store 3. Outputs $\overline{B0}$, $\overline{B1}$ and $\overline{B2}$ are taken from store 3 under the control of the word rate clock and applied to the other set of data inputs of unit 2. The function of unit 2 is to add the A bits to the B bits to generate the new accumulated disparity. This arithmetic function is performed according to the significance of signals applied to the "select function" inputs S of the unit 2. These signals are indicative of the conditions "no error," "positive error" or "negative error." These three conditions are determined by a comparison of the polarities of the word and accumulated disparities. This is performed by gates BB and CC. Gate BB is an OR function gate and has as its inputs polarity bits A2 and B2 (the input from gate AA can be ignored for the moment). Gate CC has a NOR/OR function and receives inputs $\overline{A2}$ and $\overline{B2}$. These inputs A2, B2, $\overline{A2}$ and $\overline{B2}$ are taken from the stores 1 and 3. The OR outputs C and $\overline{D}$ from gates BB and CC are taken to NOR gates DD and EE, respectively, where they are gated with a word rate clock (which may have a phase shift relevant to the clock controlling the store 1 and 3 in order to counteract propagation delays in the circuit).

The outputs of gates DD and EE are commoned and provide an error pulse output for each disparity error.

The OR output from gate BB and the NOR output from gate CC also provide the four "select function" control signals $\overline{S1}$, $\overline{S2}$ and $\overline{S0}$, $\overline{S3}$, respectively. The relationship between A2, B2 and the operation of the arithmetic logic unit 2 are shown in the table of FIG. 4. Thus, for a positive disparity error both A2 and B2 will be binary 0. Outputs C and D will both be 0 and all the $\overline{S}$ inputs will be 0. The outputs FN of unit 2 will, in this case, be the result of subtracting 1 from AN (the 3 bit binary word representing the positive accumulated disparity). The other three conditions given in the table are self explanatory.

A problem arises in the case where the word disparity is zero and is represented by the 3-bit binary word 000. Since the convention is that A2 is 0 for positive and 1 for negative, in the case of the word disparity zero disparity will always be regarded as positive. (It will be noted that whereas the accumulated disparity can only have six possible values and must be either positive or negative, word disparity in a 4B3T system can have seven possible values — three positive, three negative, and one of neither polarity). This situation will introduce errors into the output of the unit 2 even when there is no error in the signal. To overcome this it is necessary to look at the A1 and A0 bits to determine when the word disparity is zero in spite of A2 suggesting that it is positive. A0 and A1 outputs of store 1 are applied to NOR gate AA and its output E is taken to a third input on both gate BB and gate CC.

When the accumulated disparity is positive and is followed by a word disparity of +1 (rule *b* above), or the accumulated disparity is negative and is followed by a word disparity of −1 (rule *d* above) an output F from gates FF and GG (not shown) provides an inhibiting signal to store 3. This keeps the accumulated disparity output AD from store 3 unchanged as required by rules *b* and *d*.

Thus, when an error is detected, the nature of the error is determined by gates AA, BB and CC and the function of arithmetic unit 2 is selected to apply the necessary correction to the (by now) erroneous accumulated disparity which is to be held in store 3 while the error is indicated at the output of gates DD and EE.

While I have described above the principles of my invention in connection with specific apparatus it is to be clearly understood that this description is made only by way of example and not as a limitation to the scope of my invention as set forth in the objects thereof and in the accompanying claims.

I claim:

1. An error detection arrangement for a receive translator employed in a PCM system in which, for transmission, digital words having one word disparity polarity are transmitted when the accumulated disparity of a transmitted code signal is of the opposite polarity, and vice versa, said arrangement comprising first means for deriving at the conclusion of each digital word in said transmitted signal the polarity of the accumulated disparity of said transmitted signal;

second means coupled to the output of said first means for temporarily storing the polarity of the accumulated disparity derived in said first means;

third means coupled to the output of said first means for providing at the conclusion of each digital word in said transmitted signal the polarity of the word disparity of that word; and logic means coupled to said first means, said second means and said third means, said logic means being responsive to the output of said first and third means to detect when the polarity of the disparity for a digital word is the same as the polarity of the accumulated disparity for said transmitted signal at the conclusion of the previous digital word, to generate an error output signal when the two polarities are detected to be the same and to couple said error output signal to said second means to correct the information in said second means when said error output signal is generated.

2. An arrangement according to claim 1, wherein the word disparity and the accumulated disparity characteristics of said transmitted code signal are each represented in said arrangement by a three bit binary coded word having a most significant bit indicating polarity of the disparity and the remainder of the bits is a representation of the numerical value of the amplitude of the disparity.

3. An arrangement according to claim 2, wherein said logic means includes first logic gating means coupled to said second means and said third means responsive to each bit of the 3 bit word representing the word disparity and the most significant bit of the 3 bit word representing the accumulated disparity to detect when the polarity of the word disparity is the same as the polarity of the accumulated disparity at the conclusion of the previous word.

4. An arrangement according to claim 3, wherein said logic means further includes second logic gating means coupled to said first logic gating means responsive to the outputs from said first logic gating means to generate said error output signal.

5. An arrangement according to claim 4, wherein said first means includes a binary arithmetic logic unit coupled to said second means, said third means and said first logic gating means to perform arithmetic addition operations, under control of the output signals of said first logic gating means, on the 3 bit word representing the present word disparity and the 3 bit word representing the accumulated disparity at the conclusion of the previous word to produce the accumulated disparity at the conclusion of the present word and to correct the accumulated disparity at the conclusion of the present word when said error output signal is generated.

6. An arrangement according to claim 3, wherein said first means includes a binary arithmetic logic unit coupled to said second means, said third means and said first logic gating means to perform arithmetic addition operations, under control of the output signals of said first logic gating means, on the 3 bit word representing the present word disparity and the 3 bit word representing the accumulated disparity at the conclusion of the previous word to produce the accumulated disparity at the conclusion of the present word and to correct the accumulated disparity at the conclusion of the present word when said error output signal is generated.

* * * * *